US012671255B2

(12) United States Patent
Asghari et al.

(10) Patent No.: US 12,671,255 B2
(45) Date of Patent: Jun. 30, 2026

(54) SYSTEMS AND METHODS FOR CO-OPTIMIZATION OF HYDROGEN PRODUCTION AND ELECTRICITY MARKET PARTICIPATION FOR RENEWABLE ENERGY GENERATORS

(71) Applicant: BluWave Inc., Ottawa (CA)

(72) Inventors: Babak Asghari, Vancouver (CA);
Devashish Paul, Ottawa (CA);
Alexander Linchieh, Ottawa (CA);
Thomas Triplet, Ottawa (CA)

(73) Assignee: BluWave Inc., Ottawa (CA)

( * ) Notice: Subject to any disclaimer, the term of this patent is extended or adjusted under 35 U.S.C. 154(b) by 387 days.

(21) Appl. No.: 18/312,805

(22) Filed: May 5, 2023

(65) Prior Publication Data

US 2024/0372369 A1    Nov. 7, 2024

(51) Int. Cl.
H02J 3/38        (2026.01)
H02J 3/00        (2026.01)
(Continued)

(52) U.S. Cl.
CPC .............. H02J 3/381 (2013.01); H02J 3/003 (2020.01); H02J 3/004 (2020.01); H02J 3/008 (2013.01);
(Continued)

(58) Field of Classification Search
CPC .. H02J 3/003; H02J 3/004; H02J 3/008; H02J 3/28; H02J 3/381; H02J 15/008; H02J 2203/10; H02J 2300/20
See application file for complete search history.

(56) References Cited

U.S. PATENT DOCUMENTS

2014/0350743 A1*  11/2014  Asghari  ............... G05B 13/048
                                                              700/297
2020/0334609 A1*  10/2020  Pecenak  .................. H02J 3/003
(Continued)

OTHER PUBLICATIONS

Government of Canada, Natural Resources Canada, Dec. 2020, Hydrogen Strategy for Canada Retrieved from "https://www.nrcan.gc.ca/sites/nrcan/files/environment/hydrogen/NRCan_Hydrogen-Strategy-Canada-na-en-v3", pp. 1-141.
(Continued)

*Primary Examiner* — J. Campbell
(74) *Attorney, Agent, or Firm* — Borden Ladner Gervais LLP

(57)        ABSTRACT

Systems and methods are provided involving executing an optimizer using output power information of a renewable energy generator (REG) and market information, and executing an energy management system to manage the utilization of power generated by the REG based on the optimization. The REG is associated with a hydrogen production plant (HPP) for producing hydrogen, and the HPP is powered at least by the REG. The management of the power generated by the REG includes generating an electricity market offer to an electrical grid and a hydrogen market offer to an hydrogen distribution system. The system then dispatches REG power to the electrical grid and hydrogen to the hydrogen distribution system based on the generated market offers. REG output power typically fluctuates over time, as do other potentially relevant factors, such as consumer electricity demand, electricity transmission capacity, electricity market prices, hydrogen market prices, etc. The system can provide optimized control over the REG and HPP as conditions change over time.

18 Claims, 5 Drawing Sheets

(51) Int. Cl.
*H02J 3/008* (2026.01)
*H02J 15/00* (2026.01)
*H02J 15/50* (2026.01)
*H02J 101/20* (2026.01)
*H02J 103/35* (2026.01)

(52) U.S. Cl.
CPC ........... *H02J 15/50* (2026.01); *H02J 2101/20* (2026.01); *H02J 2103/35* (2026.01)

(56) References Cited

U.S. PATENT DOCUMENTS

| | | | | |
|---|---|---|---|---|
| 2020/0348662 | A1* | 11/2020 | Cella ................ | G05B 19/41865 |
| 2021/0021131 | A1* | 1/2021 | Hanayama ................ | H02J 3/38 |
| 2022/0179382 | A1* | 6/2022 | Akiba ..................... | G01W 1/10 |
| 2022/0397239 | A1* | 12/2022 | Jorgenson ................. | F17C 5/06 |
| 2023/0129279 | A1* | 4/2023 | Buttgenbach .......... | H02J 3/004 |
| | | | | 307/18 |
| 2023/0352937 | A1* | 11/2023 | Hamaguchi .............. | H02J 3/00 |

OTHER PUBLICATIONS

Green Hydrogen retrieved from "https://en.wikipedia.org/wiki/Green_hydrogen" pp. 1-17.

Hornsdale Power Reserve retrived from "https://en.wikipedia.org/wiki/Hornsdale_Power_Reserve" pp. 1-7.

Christopher Findlay, Sep. 11, 2020, What's your purpose?Reusing Gas Infrastructure for Hydrogen Transportation, Siemens Energy Global, Retrieved from "https://www.siemens-energy.com/global/en/news/magazine/2020/repurposing-natural-gas-infrastructure-for hydrogen.html#:~:text=Hydrogen%20can%20be%20transported%20as%20a%20gas%20in,very%20high%20energy%20transportation%20capacity%20can%20be%20achieved" pp. 1-7.

International Patent Application No. PCT/CA2023/051455, International Search Report and Written Opinion, dated Feb. 20, 2024.

* cited by examiner

500

600

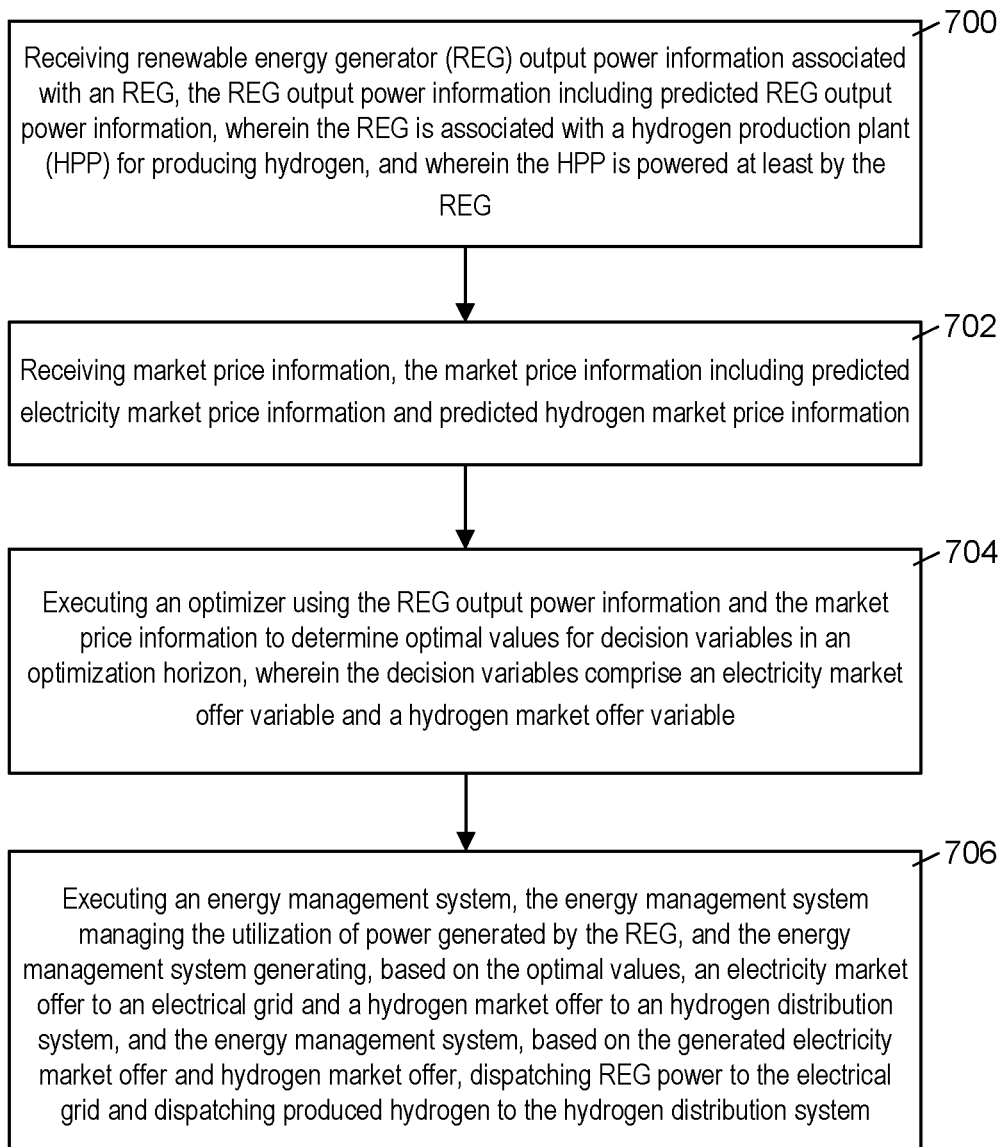

700

Receiving renewable energy generator (REG) output power information associated with an REG, the REG output power information including predicted REG output power information, wherein the REG is associated with a hydrogen production plant (HPP) for producing hydrogen, and wherein the HPP is powered at least by the REG

702

Receiving market price information, the market price information including predicted electricity market price information and predicted hydrogen market price information

704

Executing an optimizer using the REG output power information and the market price information to determine optimal values for decision variables in an optimization horizon, wherein the decision variables comprise an electricity market offer variable and a hydrogen market offer variable

706

Executing an energy management system, the energy management system managing the utilization of power generated by the REG, and the energy management system generating, based on the optimal values, an electricity market offer to an electrical grid and a hydrogen market offer to an hydrogen distribution system, and the energy management system, based on the generated electricity market offer and hydrogen market offer, dispatching REG power to the electrical grid and dispatching produced hydrogen to the hydrogen distribution system

FIG. 7

SYSTEMS AND METHODS FOR CO-OPTIMIZATION OF HYDROGEN PRODUCTION AND ELECTRICITY MARKET PARTICIPATION FOR RENEWABLE ENERGY GENERATORS

FIELD

The present disclosure relates to renewable energy generators (REGs), and more particularly to a renewable energy generator operating in association with another plant, such as a hydrogen production plant.

BACKGROUND

Renewable energy generators (REGs), such as wind and solar farms, are increasingly developed and connected to the power grid across the globe to combat global warming and facilitate the transition from fossil fuel generation to clean energy. These REGs are typically located in remote locations far from urban load centers, for example due to their large space requirements, or high availability of solar irradiance or windiness or other source of energy of those areas. REGs are often connected to transmission or distribution lines of a power grid in order to transfer the generated renewable electricity to load centers where the electricity demand is high. The output power of an REG typically fluctuates with weather conditions, such as wind speed or solar irradiance, and thus is not consistent over time.

There are various challenges in efficiently utilizing power generated by REGs. One such challenge is reconciling the fluctuating power production of REGs with the fluctuating demand for power by end consumers since the levels of production and demand are often not in synch. A common approach is to attempt to store REG power when demand is lower, and then to dispatch the stored power when demand is higher. However, this approach has several of its own challenges, including limited capacity for REGs to temporarily store the power.

Another challenge relates to transmitting REC power to desired regions of the grid. For example, an issue is transmission line congestion, which happens when the transmission line connecting an REG to load centers is already loaded at full capacity and does not have any spare capacity to transfer REG generation across the grid. In some cases, extreme line congestion coupled with excess REG generation can result in grid instability and outages. To avoid this situation, a regional Independent System Operator (ISO), for example, may require an REG to curtail its generation to stabilize the grid. This may result in underutilization of REG resources for the REG owner.

Another challenge involving an underutilization of REGs is the power rating of an inverter at an REG that converts Direct Current (DC) power output of, for example wind or solar generation, to AC power before connecting the system to the grid. Sometimes, to make an REG project financially feasible or because of an interconnect limit imposed by the system operator, the power rating of the inverter is chosen to be less than the maximum DC power output of the REG unit. In such a case, the maximum power output of the REG unit is restricted by the inverter and REG generation is underutilized whenever the DC power output of the REG unit exceeds the inverter rating.

Accordingly, improvements are desired, including in techniques relating to the efficient utilization of power generated by REGs.

The above information is presented as background information only to assist with an understanding of the present disclosure. No assertion or admission is made as to whether any of the above, or anything else in the present disclosure, unless explicitly stated, might be applicable as prior art with regard to the present disclosure.

SUMMARY

According to an aspect, the present disclosure is directed to a system comprising a computer-readable storage medium having executable instructions, and one or more computer processors configured to execute the instructions to receive renewable energy generator (REG) output power information associated with an REG, the REG output power information including predicted REG output power information, wherein the REG is associated with a hydrogen production plant (HPP) for producing hydrogen, and wherein the HPP is powered at least by the REG, receive market price information, the market price information including predicted electricity market price information and predicted hydrogen market price information, execute an optimizer using the REG output power information and the market price information to determine optimal values for decision variables in an optimization horizon, wherein the decision variables comprise an electricity market offer variable and a hydrogen market offer variable, and execute an energy management system, the energy management system managing the utilization of power generated by the REG, and the energy management system generating, based on the optimal values an electricity market offer to an electrical grid, and a hydrogen market offer to an hydrogen distribution system, and the energy management system, based on the generated electricity market offer and hydrogen market offer, dispatching REG power to the electrical grid and dispatching produced hydrogen to the hydrogen distribution system.

In an embodiment, the decision variables further comprise an energy storage system (ESS) charge-discharge variable for an ESS associated with the REG, and wherein the energy management system controls, based on the optimal values selectively charging the ESS with power generated by the REG, and selectively dispatching power from the ESS to the HPP and/or to an electrical grid.

In an embodiment, the decision variables further comprise a HPP operation variable, and wherein the energy management system, based on the optimal values, selectively dispatches REG power to the HPP based on the optimal values.

In an embodiment, the energy management system, based on the optimal values, selectively provides power to the HPP using power imported from an electrical grid.

In an embodiment, the decision variables further comprise a hydrogen storage system fill-discharge variable for an hydrogen storage system associated with the HPP, and wherein the energy management system controls, based on the optimal values selectively storing produced hydrogen in the hydrogen storage system, and selectively dispatching hydrogen from the hydrogen storage system to the hydrogen distribution system.

In an embodiment, the energy management system controls, based on the optimal values selectively receiving hydrogen from the hydrogen distribution system and storing the received hydrogen in the hydrogen storage system.

In an embodiment, the one or more computer processors are further configured to execute the instructions to receive electrical grid demand information, the electrical grid demand information including predicted electrical grid demand information, wherein the optimizer is executed further using the electrical grid demand information.

In an embodiment, the one or more computer processors are further configured to execute the instructions to execute a predictor comprising a predictive model to predict at least one of the predicted REG output power information, the predicted electricity market price information, and the predicted hydrogen market price information, wherein the predictive model comprises a machine learning model.

In an embodiment, the optimizer comprises a reinforcement learning model.

According to an aspect, the present disclosure is directed to a method comprising at one or more electronic devices each having one or more processors and computer-readable memory receiving renewable energy generator (REG) output power information associated with an REG, the REG output power information including predicted REG output power information, wherein the REG is associated with a hydrogen production plant (HPP) for producing hydrogen, and wherein the HPP is powered at least by the REG, receiving market price information, the market price information including predicted electricity market price information and predicted hydrogen market price information, executing an optimizer using the REG output power information and the market price information to determine optimal values for decision variables in an optimization horizon, wherein the decision variables comprise an electricity market offer variable and a hydrogen market offer variable, and executing an energy management system, the energy management system managing the utilization of power generated by the REG, and the energy management system generating, based on the optimal values an electricity market offer to an electrical grid, and a hydrogen market offer to an hydrogen distribution system, and the energy management system, based on the generated electricity market offer and hydrogen market offer, dispatching REG power to the electrical grid and dispatching produced hydrogen to the hydrogen distribution system.

In an embodiment, the decision variables further comprise an energy storage system (ESS) charge-discharge variable for an ESS associated with the REG, and wherein the method further comprises controlling, based on the optimal values selectively charging the ESS with power generated by the REG, and selectively dispatching power from the ESS to the HPP and/or to an electrical grid.

In an embodiment, the decision variables further comprise a HPP operation variable, and wherein the method further comprises, based on the optimal values, selectively dispatching REG power to the HPP based on the optimal values.

In an embodiment, the method further comprises, based on the optimal values, selectively providing power to the HPP using power imported from an electrical grid.

In an embodiment, the decision variables further comprise a hydrogen storage system fill-discharge variable for an hydrogen storage system associated with the HPP, and wherein the method further comprises controlling, based on the optimal values selectively storing produced hydrogen in the hydrogen storage system, and selectively dispatching hydrogen from the hydrogen storage system to the hydrogen distribution system.

In an embodiment, the method further comprises controlling, based on the optimal values selectively receiving hydrogen from the hydrogen distribution system and storing the received hydrogen in the hydrogen storage system.

In an embodiment, the method further comprises receiving electrical grid demand information, the electrical grid demand information including predicted electrical grid demand information, wherein the executing the optimizer uses the electrical grid demand information.

In an embodiment, the method further comprises executing a predictor comprising a predictive model to predict at least one of the predicted REG output power information, the predicted electricity market price information, and the predicted hydrogen market price information, wherein the predictive model comprises a machine learning model.

In an embodiment, wherein the optimizer comprises a reinforcement learning model.

According to an aspect, the present disclosure is directed to a non-transitory computer-readable medium having computer-readable instructions stored thereon, the computer-readable instructions executable by at least one processor to cause the performance of operations comprising receiving renewable energy generator (REG) output power information associated with an REG, the REG output power information including predicted REG output power information, wherein the REG is associated with a hydrogen production plant (HPP) for producing hydrogen, and wherein the HPP is powered at least by the REG, receiving market price information, the market price information including predicted electricity market price information and predicted hydrogen market price information, executing an optimizer using the REG output power information and the market price information to determine optimal values for decision variables in an optimization horizon, wherein the decision variables comprise an electricity market offer variable and a hydrogen market offer variable, and executing an energy management system, the energy management system managing the utilization of power generated by the REG, and the energy management system generating, based on the optimal values an electricity market offer to an electrical grid, and a hydrogen market offer to an hydrogen distribution system, and the energy management system, based on the generated electricity market offer and hydrogen market offer, dispatching REG power to the electrical grid and dispatching produced hydrogen to the hydrogen distribution system.

In an embodiment, the decision variables further comprise an energy storage system (ESS) charge-discharge variable for an ESS associated with the REG, and wherein the operations further comprise controlling, based on the optimal values selectively charging the ESS with power generated by the REG, and selectively dispatching power from the ESS to the HPP and/or to an electrical grid.

The foregoing summary provides some example aspects and features according to the present disclosure. It is not intended to be limiting in any way. For example, the summary is not necessarily meant to identify important or crucial features of the disclosure. Rather, it is merely meant to introduce some concepts according to the disclosure. Other aspects and features of the present disclosure are apparent to those ordinarily skilled in the art upon review of the following description of specific example embodiments in conjunction with the accompanying figures.

BRIEF DESCRIPTION OF THE DRAWINGS

Example embodiments of the present disclosure will now be described with reference to the attached Figures.

FIG. 7 is a process flow diagram of an example method.

Figure 1:
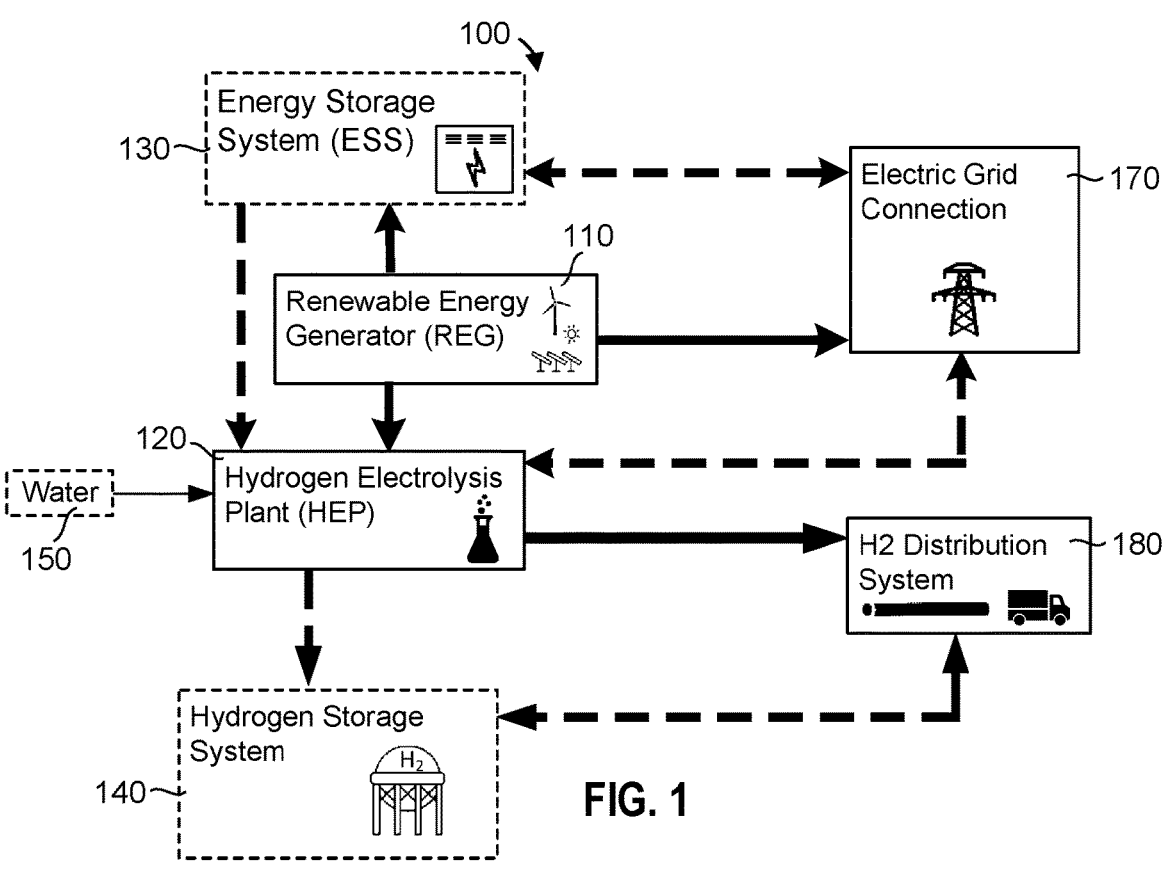
FIG. 1 is a block diagram of an example system comprising an REG and a hydrogen production plant.

The relative sizes and relative positions of elements in the drawings are not necessarily drawn to scale. For example, the shapes of various elements and angles are not necessarily drawn to scale, and some of these elements may be arbitrarily enlarged and/or positioned to improve the readability of the drawings. Further, the particular shapes of the elements as drawn are not necessarily intended to convey any information regarding the actual shape of the particular elements, and have been solely selected for ease of recognition in the drawings.

DETAILED DESCRIPTION

The present disclosure generally relates to improvements in technologies relating to control and management of renewable energy generators (REGs).

These improvements include improvements in technologies relating to control and management of an REG associated with another plant, such as a hydrogen production plant. The improvements can enhance the efficient utilization of renewable energy and can also reduce the inefficient utilization and waste of generated renewable energy. The present systems and methods may provide improvements to renewable energy systems and technologies, for example by more effectively and efficiently capturing and utilizing generated renewable energy, including when market demand for electricity is low. Furthermore, the present improvements include improvements in computerized energy management system software and hardware technologies, which may enable the above noted overall improvements in control and management of renewable energy generators (REGs) and associated plants.

In current approaches, many REGs provide different services to the electrical grid and earn revenue by participating in their regional electricity markets. When participating in an electricity market, a REG operator typically submits offers to sell specific quantities of electricity in the future at a certain price to the market. A market may be divided into equally spaced time blocks over a day (for example 96×15 min blocks or 24×1 hrs blocks or 288×5 min blocks, and so on) or any other time period. The market may accept offers for the same day, and/or for the next day (e.g. day ahead), or for some future time period. These offers may then be processed together with offers from other generators in the system and bids from buyers of electricity in the centralized system of regional Independent System Operator (ISO) in what is called the market clearing process. When an offer from a REG clears the market, meaning the offer is accepted, the owner of REG is compensated based on market clearing price and REG actual performance during the trading interval according to predefined market rules of the ISO.

Electricity market participation by an REG has several challenges, some of which have been already described. These challenges can result in underutilization of the REG by generating less electricity than what the REG unit can actually produce, or by earning less revenue from the market because, for example, of a mismatch between high price and high REG generation periods. The market clearing prices fluctuate throughout a day and over a year and are affected by many parameters related to market participants and operational constraints of the grid.

For instance, REGs, which typically depend on weather conditions, may be intermittent and may produce more power at a time when there is little electricity demand in the system. This often results in low market clearing prices and low revenue for the owner of REG and potentially discourages future investments in renewable projects. In extreme cases when there is more electricity generation than demand in the system, market prices can become negative, meaning that REG pays the consumers to use its electricity generation. While negative prices incentivize the consumers to increase their electricity demand, the owner of the REG unit would incur a loss. Storing the excess REG output energy in any form to avoid the necessity for instant consumption across the grid can reduce such losses for REG owners.

In another scenario, the market clearing prices for a zone or region where an REG belongs to are substantially lower than the average market clearing prices across the system due to operational constraints of the grid. These operational constraints can be in the form of transmission line congestion, which happens when the transmission line connecting an REG to load centers is already loaded at full or almost full capacity and does not have any or sufficient spare capacity to transfer REG generation across the grid. In such a case, the REG may be forced to sell its power within its own zone where the electricity demand and accordingly market prices can be lower. This can reduce the revenue for the REG. In addition, as previously mentioned, in some cases, high line congestion coupled with excess REG generation may result in grid instability and outages. To avoid this situation, the ISO may require an REG to curtail its generation to stabilize the grid. This results in underutilization of REG resources and severe financial losses for an REG owner.

To mitigate some of the aforementioned challenges in market participation of REG assets, an REG may utilize an energy storage system (ESS), such as batteries, to store the REG output power temporarily and sell it to the market at a later time when the conditions are economically or operationally more favorable for the REG. These ESSs typically have a limited energy capacity typically in the order of a few hours of charge/discharge power. Thus, they are typically only useful in capturing intraday swings of the market prices or storing a portion of curtailed REG power output for future uses. However, ESSs are generally not useful when there is an extended duration of low market prices or congestions in the system. On-site long duration ESSs are presently generally not economically feasible due to their high costs and their technological challenges.

Another approach to address some of the challenges in REG market participation is to upgrade transmission capacity, for example of the grid, by building new transmission lines and installing new power equipment to carry REG output power to load centers where market prices are higher and relieve the congestion in the power grid. However, such an approach requires a large capital investment in grid infrastructure by the grid operator. Also, building new transmission lines is typically a lengthy process, which requires system level planning studies and approval from many jurisdictions and federal and local agencies which will typically take multiple years to complete.

The present disclosure generally relates to renewable energy generators (REGs), and more specifically to a renewable energy generator operating in association with a hydrogen production plant or other plant.

In an aspect, the present disclosure relates to a renewable energy generator operating in association with a hydrogen production plant. A system executes an optimizer using relevant inputs to efficiently or advantageously provide control to the REG and hydrogen production plant. REG output power typically fluctuates over time, as do other potentially relevant factors, for example consumer electricity demand, electricity transmission capacity, electricity market prices, hydrogen market prices, and so on. Accordingly, the optimized solution will typically vary over time as conditions change.

In an embodiment, the system may, for example, optimize electricity market offers to sell REG power to an electrical grid, optimize how much REG power to dispatch to an electrical grid, how much REG power to provide to the hydrogen production plant, and/or how much REG power to store in an energy storage system (ESS). The optimization may be based on any suitable input information, for example one or more of predicted electricity prices, predicted electricity demand, predicted electrical transmission capacity, predicted REG output power, predicted hydrogen prices, hydrogen production plant production capacity, current hydrogen storage levels, current ESS storage levels, and so on.

In an embodiment, a system executes an optimizer using suitable inputs to determine when and/or if may be more efficient or advantageous to use power generated by the REG to produce hydrogen rather than dispatching the power to an electrical grid.

In an embodiment, an energy management system executes an optimizer using relevant inputs to determine optimal values for decision variable(s), and the energy management system generates, based on the optimal values, an electricity market offer to an electrical grid (or other electricity purchaser), and a hydrogen market offer to a hydrogen distribution system (or other hydrogen purchaser). The energy management system may then dispatch, based on the generated offer(s), REG power to the electrical grid and/or dispatch produced hydrogen to the hydrogen distribution system.

A system may optimize for any one or more suitable objectives. For example, potential objectives include minimizing the amount of REG power that is wasted or has to be sold at low cost, maximizing the amount of REG power that is sold to an electrical grid, maximizing the amount of hydrogen production by the hydrogen production plant, maximizing revenue or profit from sales of power and/or hydrogen, and so on. The objectives may be based on a time window or time horizon. The time period to optimize into the future is typically referred to as an optimization horizon. For example, the system may optimize for the next 24-hour time period, or for any other suitable time horizon at any time in the future. In addition, a system may optimize with regard to multiple objectives. As a mere example, a co-optimization system may seek to maximize revenue from renewable energy generation by defining a multi-objective or multi-reward function from electricity market revenues and hydrogen production or market revenues.

The present disclosure provides systems, methods, and techniques that address some of the shortcomings of existing approaches.

According to the present disclosure, an REG may be associated with a hydrogen production plant, and power generated by the REG may be selectively sold, for example to a grid, or used to power a hydrogen production plant, or some combination thereof. A system may optimize for one or more objectives in determining how to utilize power generated by the REG. In an embodiment, hydrogen generated by the hydrogen production plant may be sold. Thus, the system may optimize for one or more objectives in determining how to utilize power generated by the REG and how to utilize the produced hydrogen. In some embodiments, an ESS may be used to store power produced by the REG and/or received from the grid. In some embodiments, a hydrogen storage system may be used to store hydrogen generated by the hydrogen production plant and/or from hydrogen received from a hydrogen distribution system. Thus, the system may optimize for one or more objectives in determining how to utilize power generated by the REG and/or stored in an ESS, and/or how to utilize the produced hydrogen and/or hydrogen stored in a hydrogen storage system.

FIG. 1 is a block diagram of an example system 100 comprising an REG 110 and a hydrogen production plant (HPP) 120, which will be referred as a hydrogen electrolysis plant (HEP). REG 110 may comprise any suitable form(s) of renewable energy generation, including but not limited to solar farms, wind farms, hydroelectric plants, and so on. Generally, while certain embodiments in the present disclosure are described as having a HEP, this is not meant to be limiting. Any suitable hydrogen production plant or system may be used, meaning other than one using hydrogen electrolysis. Other types of hydrogen production, including those using electricity, may be used. Power generated by REG 110 may be provided to the HEP 120 for use in producing hydrogen. In FIG. 1, the arrows generally represent at least the flow of electricity or hydrogen. In addition, the arrow from water source 150 represents the flow of water.

REG 110 may be electrically connected to an electrical grid 170, and more specifically to a transmission or distribution part of a grid, so that power produced at REG 110 may be transmitted to the grid for eventual use by a consumer. It is to be understood that electrical grid 170 generally includes any suitable types of electricity transmission means or electricity purchasers, and thus is not limited only to conventional electrical grids. In an embodiment, REG power may be sold via electricity markets, for example operated by a regional Independent System Operator (ISO). REG power may be transferred across grid 170 through transmission lines.

Furthermore, REG 110 may be connected to HEP 120 to provide REG power to HEP 120 for use in producing hydrogen.

Additionally, REG 110 may be associated with an energy storage system (ESS) 130. ESS 130 may comprise any suitable type(s) of energy storage technology, including but not limited to battery, pumped hydro, gravitational storage, flywheel, and so on. In some embodiments, ESS 130 may be located on-site relative to REG 100. In some embodiments, ESS 130 may be located off-site. REG power may be selectively stored in ESS 130 for later use. Additionally, in some embodiments, power from other sources, such as from grid 170, may be stored in ESS 130, for example when the price of power from grid 170 is low or even negative. Furthermore, power stored in ESS 130 may be selectively discharged, for example to HEP 120 for use in producing hydrogen, or to grid 170, for example when electricity prices are favorable. Additionally, HEP 120 may be connected to another power source, such as grid 170, for receiving power.

For example, HEP 120 may be selectively powered by power from grid 170, for instance when electricity prices are favourable, which may generally mean low.

HEP 120 may be connected to a source of water 150 for use in the hydrolysis.////Water source 150 may comprise a water storage and treatment facility of any suitable technology (ies), for example compatible with groundwater, sea water, wastewater, rainwater, or any other form of water. In addition, depending on the HEP technology of HEP 120, part of a water treatment process may be performed at HEP 120 before the electrolysis process to produce hydrogen.

Additionally, HEP 120 may be connected to a hydrogen distribution system 180 so that hydrogen produced at HEP 120 may be transmitted or transported off site for use elsewhere. Hydrogen distribution system 180 may comprise any suitable ways of transmitting or transporting hydrogen, including a physical pipeline(s), or transport vehicles such as trucks or ships. Additionally, HEP 120 may be associated with a hydrogen storage system 140, which in some embodiments may be located on-site relative to HEP 120. In some embodiments, hydrogen storage system 140 may be located off-site, or some combination of on-site and off-site.

In addition, in other embodiments, REG power may be used to power other processes instead of or in addition to a HEP. For example, REG power may be used to power a water desalination plant to produce freshwater. In addition, REG power may be converted for other types of energy storage, for example battery, gravitational, thermal, pumped hydro, compressed air, and so on.

Produced hydrogen may be selectively stored in hydrogen storage system 140 for later use. Additionally, in some embodiments, hydrogen from other sources, such as from hydrogen distribution system 180, may be stored in hydrogen storage system 140, for example when the price of hydrogen from hydrogen distribution system 180, for example via a hydrogen market, is low or even negative. Furthermore, hydrogen stored in hydrogen storage system 140 may be selectively discharged, for example to hydrogen distribution system 180, for example when hydrogen prices are favorable or if hydrogen storage system 140 is at or nearing full capacity.

Figure 2:
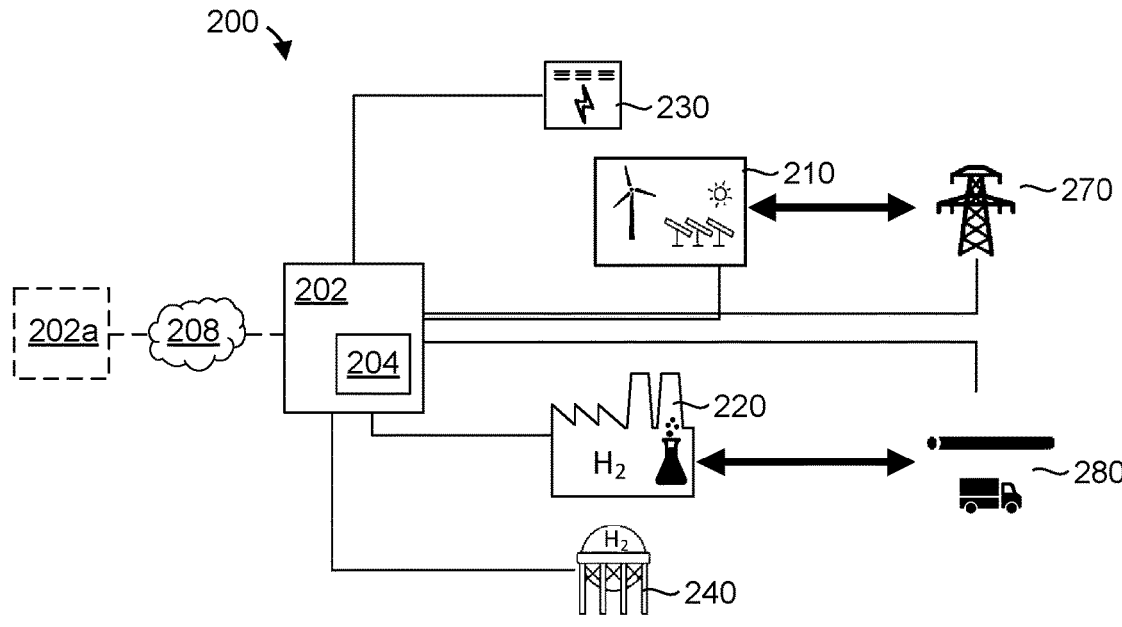
FIG. 2 is a block diagram of an example system comprising an energy management system for controlling a REG, a HEP, an ESS, and/or a hydrogen storage system.

FIG. 2 is a block diagram of an example system 200 comprising an energy management system 202, which may be used to provide control to one or more of REG 210, HEP 220, ESS 230, or hydrogen storage system 240. Energy management system 202 may manage the utilization of power generated by the REG. In FIG. 2, the lines connecting various blocks generally represent at least the flow control signals or other information. Furthermore, the various lines are only examples, and thus are not limiting in any way.

Figure 8:
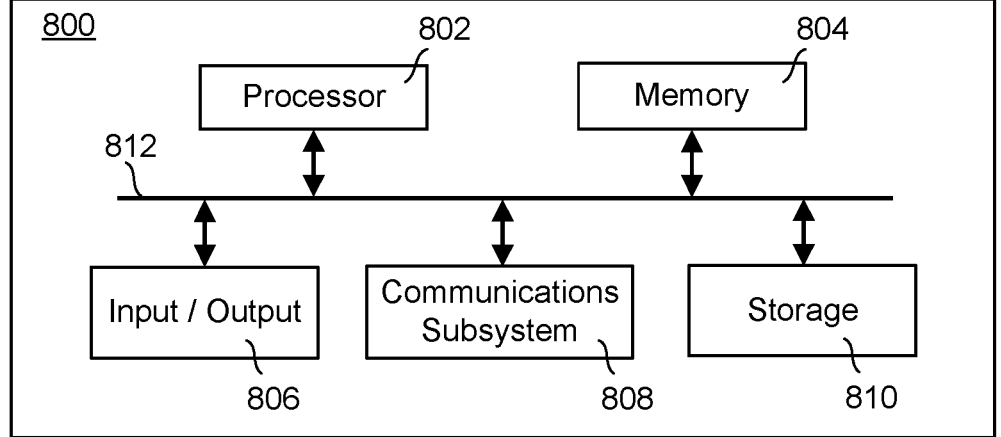
FIG. 8 is a block diagram of an example computerized device or system.

Energy management system 202 may comprise or be implemented using a computing device, for example a computerized device or system 800 according to FIG. 8, and may be located on-site with the REG 210, off-site from the REG 210, or partly on-site and partly off-site. An offsite version, or part thereof, of energy management system 202a may be communicatively coupled with an onsite part of energy management system 202, or with one or more of REG 210, HEP 220, ESS 230, or hydrogen storage system 240 via a communication channel or link, which may comprise a communications network 208.

Energy management system 202 may provide control and management of one or more of REG 210, HEP 220, ESS 230, or hydrogen storage system 240, and may do so in a coordinated manner. Energy management system 202 may comprise an optimizer or optimizer engine 204 for performing optimizations according to the present disclosure. REG output power typically fluctuates over time. Thus, decisions on how REG power is utilized may also change over time, and such decisions may be based on, for example, electrical grid demand information, consumer electricity demand, power transmission capacity, electricity market prices, consumer hydrogen demand, hydrogen transmission or transportation capacity, hydrogen market prices, and so on.

Energy management system 202 may optimize for one or more objectives. For example, an objective may be to minimize the amount of REG power that is wasted or has to be sold at low cost or even at a loss. Another objective may be to maximize the amount of REG power that is sold to an electrical grid, where there may be one or more constraints such as peak REG generation, transmission line capacity, consumer demand, and so on. Another objective may be to maximize the amount of hydrogen production by the hydrogen production plant, where there may be one or more constraints such as a peak hydrogen production level of the plant, amount of available of REG power to be used by the plant, transmission capacity and/or storage capacity for the generated hydrogen (since the produced hydrogen has to go somewhere), and so on. Another objective may be to maximize revenue, profit, or some other financial metric, relating to the REG and/or hydrogen production plant (or to minimize cost, expenses, etc.). For example, an objective may be to maximize the combined revenue from sales of power and hydrogen from the REG and/or hydrogen production plant. The objectives may be based on a time window or time horizon. For example, the system may optimize for the next 24-hour time period, or for any other suitable time horizon at any time in the future. In addition, a time horizon may be subdivided into several sub time slots. For example, a future 24-hour time horizon may be subdivided into 24 1-hour blocks, 48 30-minute blocks, and so on.

Figure 3:
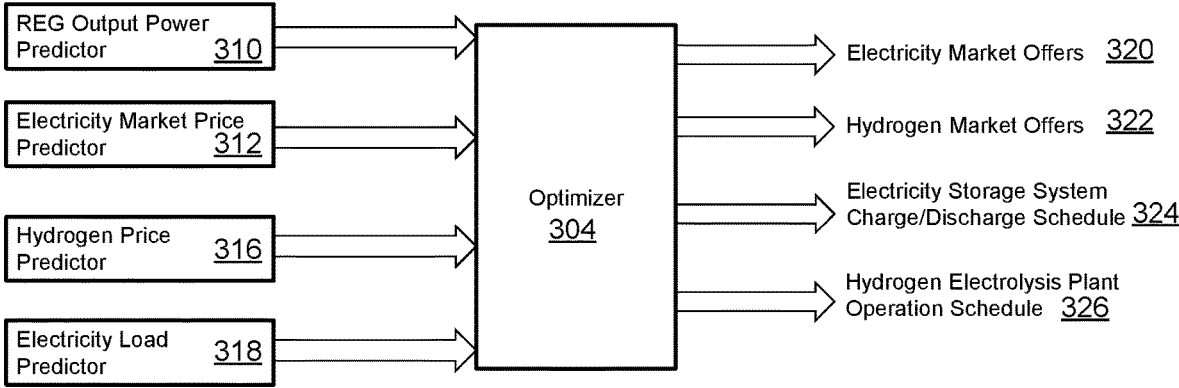
FIG. 3 is a block diagram showing some example prediction-based input information and example outputs of an optimizer of an energy management system.

FIG. 3 is a block diagram showing some example prediction-based input information and example outputs of an optimizer 304 of an energy management system. It is to be noted that optimizer 304 may receive other information or data as input information. In other words, input information to optimizer 304 is not limited to outputs of predictor modules.

Energy management system 202 may execute the optimizer using relevant inputs to determine optimal value(s) for decision variable(s). In performing the optimizations, system 202 may determine, for example, how much REG power to dispatch to an electrical grid, how much REG power to provide to the hydrogen production plant, and/or how much REG power to store in an energy storage system (ESS). These determinations may be made for a future time horizon, for example a future 24-hour time horizon. In addition, when a time horizon is subdivided into small time slots (e.g. 24 1-hour slots within a 24 hour time horizon), the determinations may be made for some or all of the time slots.

Input to the optimizer may comprise any suitable forms of information. For example, input information, may include one or more of predicted electricity prices, for example from an electricity market price predictor 312, predicted electricity demand or load, for example from an electricity load predictor 318, predicted electrical transmission capacity, predicted REG output power, for example from a REG output power predictor 310, predicted hydrogen prices, for example from a hydrogen price predictor 316, hydrogen production plant production capacity, current hydrogen storage levels, current ESS storage levels, current or predicted water storage levels, and so on. Electricity load predictor 318 may predict an overall electrical load in a grid, for example based on predicted consumer demand, which may also be referred to as predicted electrical grid demand information.

Energy management system 202 may then generate or output, based on the optimal values, for example an electricity market offer(s) 320 to an electrical grid 270 (or other electricity purchaser), or a hydrogen market offer(s) 322 to a hydrogen distribution system 280 (or other hydrogen purchaser), an ESS charge/discharge schedule 324, a HEP operation schedule 326, or a hydrogen storage system fill-discharge schedule for a hydrogen store system associated with the HEP.

An electricity market offer may generally comprise an offer to sell a defined amount of power during a defined future time period at a specified price. Similarly, a hydrogen market offer may generally comprise an offer to sell a defined amount of hydrogen during a defined future time period at a specified price. An ESS charge/discharge schedule may generally relate to the charging of the ESS with energy and the discharging of energy from the ESS to another location, for example to the HEP or to the grid. Schedule information may include dates, times, rates, and so on of charging and/or discharging. Similarly, a hydrogen storage system fill-discharge schedule may generally relate to filling of the hydrogen storage system with hydrogen and the discharging of hydrogen from the hydrogen storage system to another location, for example to a hydrogen distribution system, which may comprise one or more pipelines, or vehicles such as trucks or ships configured to transport hydrogen.

Energy management system 202 may then dispatch, based on the generated offer(s), REG power to the electrical grid 270 and/or dispatch produced hydrogen to the hydrogen distribution system 280.

Energy management system 202 may comprise, or communicate with, one or more predictors, for example predictor modules or subsystems, for predicting, forecasting, or estimating certain types of values, data, or other information. System 202 may comprise one or more predictors for predicting, for example, electricity prices, electricity demand or load, electrical transmission capacity, REG output power, hydrogen prices, and so on. Some mere example predictors 310, 312, 314, 318 are show in FIG. 3. A predictor may predict its target variable(s) over a predefined time horizon or window. Information based on the output of the predictor(s) may be provided as input to the optimizer of the energy management system 202.

The optimal solution may be determined on a rolling basis, that is, at intervals and optionally for a horizon of time into the future. Further, the optimizer may simultaneously determine actions and/or schedules for controllable assets, such as one or more of REG 210, HEP 220, ESS 230, or hydrogen storage system 240.

In an embodiment, there is a hydrogen market wherein hydrogen production plants and/or hydrogen storage systems may be connected with the hydrogen market itself least via pipelines. The hydrogen market may have some similar constraints as an electricity market. The hydrogen market may operate on a similar offer and clearing process as an electricity market where sellers submit offers to sell quantities of hydrogen in the future at specified prices to the market. The future time periods may be a day or part of a day, and the day may be subdivided into equally spaced time blocks over a day, for example 96×15 minute blocks, or 24×1 hour blocks, 288×5 minute blocks, and so on. Selling periods may be essentially real time, within the current day, within the next day, or in other future days.

A producer of hydrogen may have contracts with buyers that have to be fulfilled. Any excess supply of hydrogen may then be sold in the market, for example in a real time market and/or in the day ahead market. An energy management system according to the present disclosure may be utilized to optimize for one or more objectives, where one or more decision variables in the optimization may be used to control or manage the selling of the excess supply of hydrogen in the market. In an embodiment, an objective may be maximizing the amount of hydrogen production by the hydrogen production plant, maximizing the amount of hydrogen sold, maximizing revenue or profit from sales of hydrogen, and so on. In an embodiment, the hydrogen production plant may be operated in association with an REG, as described herein. An objective may be maximizing revenue or profit from sales of both power and hydrogen.

In an embodiment, a predictor may be a machine learning based system, and thus may be trained using training data. A predictor may use one or multiple machine learning models to predict some type of information, often referred to as a target or target variable. The training data may include one or more of historical data and live data. A predictor may be retrained at various points in time.

Figure 4:
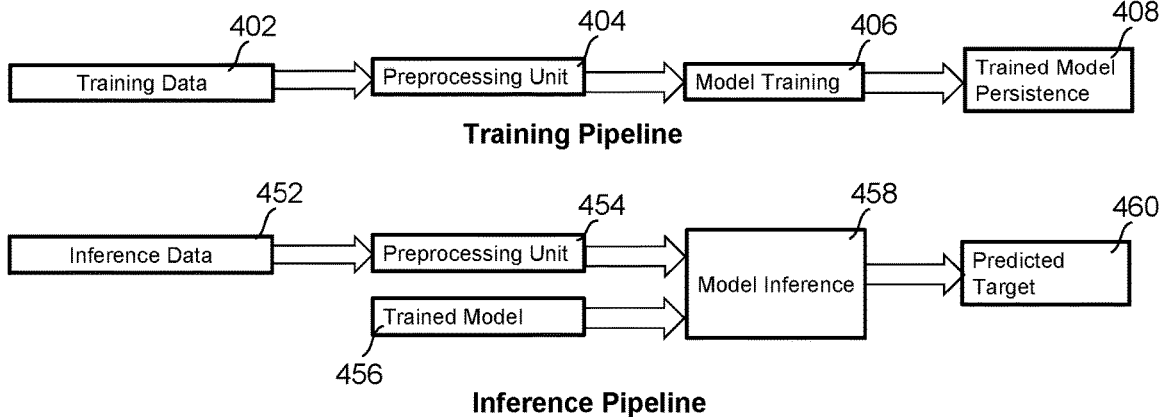
FIG. 4 is a block diagram showing an example training pipeline and an example inference pipeline for a predictor.

In an embodiment, a predictor may comprise a training pipeline and an inference pipeline. FIG. 4 is a block diagram showing an example training pipeline and an example inference pipeline for a predictor. A training pipeline and/or an inference pipeline for a predictor may be implemented at energy management system 202 or at any other suitable device or location.

A training pipeline may generally refer to a process including one or more of obtaining training data 402, preprocessing the training data 404, training a predictor model 406 using the preprocessed training data, and retaining or storing the trained model 408.

A training pipeline may generally collect historical data from any suitable sources, for example from the larger system, including one or more of REG 210, HEP 220, ESS 230, or hydrogen storage system 240, from telemetry or other measurements of the system, from one or more external data providers, and so on. Further, historical data may be collected over a preferred horizon, meaning a defined time period in the past, as opposed to using all available historical data. In an example, a training model may use the most recent available historical data over the past one year, or any other suitable time period.

In an embodiment, historical data may comprise of a feature set matrix and a target vector. A feature set matrix comprises a set of data inputs, known as features, which are mapped to predictor or target variable(s) in the target vector.

In an embodiment, for a REG output power predictor, each row of the feature set matrix may include (but not limited to) date and time, weather data (such as irradiance, cloud coverage, wind speed, temperature, or humidity, and so on), or autocorrelation features (such as lags, mean, variance, or max, and so on). Each value in a target vector may be a measurement of REG output power in the past corresponding to the date and time from the same row in the feature set matrix.

In an embodiment, for an electricity market price predictor, each row of the feature set matrix may include (but not limited to) date and time, weather data (such as irradiance, cloud coverage, wind speed, temperature, humidity, and so on, at multiple locations across the ISO territory), autocorrelation features (such as lags, mean, variance, max, and so on), or market data (such as system-wide or zonal wind/solar/natural gas/coal generations across the ISO territory, system-wide or zonal demand across the ISO territory, transmission line congestion data, and so on). Each value in a target vector may be a historical electricity market price in the past corresponding to the date and time from the same row in the feature set matrix.

In an embodiment, for a hydrogen price predictor, each row of the feature set matrix may include date and time, autocorrelation features (such as lags, mean, variance, max, and so on of historical prices over a fixed horizon), or total supply of hydrogen across the region. Each value in the target vector may be a historical electricity market price corresponding to the date and time from the same row in the feature set matrix.

In an embodiment, for an electrical load predictor, each row of the feature set matrix may include (but not limited to) date and time, weather data (such as irradiance, cloud coverage, wind speed, temperature, humidity, and so on at multiple locations across the ISO territory), autocorrelation features (such as lags, mean, variance, max, and so on). Each value in the target vector may be a historical electricity demand in the past corresponding to the date and time from the same row in the feature set matrix.

The preprocessing of the training data 404 may include using a data processor, which may perform data cleaning, data conditioning, data warehousing or other operations on received data. The data processor may transform data into a format more suitable for machine learning techniques, such as supervised learning. Additionally, the data processor may perform other tasks such as identifying and removing outliers from the data, filling-in or removing gaps in any of data sources, or applying standardization/normalization/transformation techniques on the data to make the training or inference processes more accurate.

The training of a predictor model 406 may include one or more tasks or operations, for example model selection, hyperparameter tuning, or training of the selected model(s) to develop a mapping between curated feature set matrix and target variable. A predictor model may be a single machine learning model or an ensemble of multiple models.

Once the predictor model has been trained, it may be stored, for example in a file or database in a computing device.

A predictor may be retrained at various points in time, for example on a regular basis or at any other intervals, in an attempt to improve its relevance and accuracy to current operations. Further, a predictor may be retrained when the inference accuracy falls below a predefined threshold, for example in order to use the most recent data for training and correct any drifts between training and inference data. A predictor may be retrained, for example using an ever-increasing supply of data that is incoming from live operations, and subsequently redeployed to continue providing predictor information with improved accuracy. This may in turn provide for greater accuracy or efficiency of the output of the optimizer.

Referring again to FIG. 4, an inference training pipeline may generally refer to a process including one or more of collecting inference data 452, possibly including forecasted data (over a preferred inference horizon), preprocessing the inference data 454, running 458 the trained model 456 using the inference data, and retaining or storing the predicted target variable 460. An inference horizon specifies for how far in the future, and possibly at what frequency, the predictions are generated for. As a mere example, the predictions may be made for the next 48 hours at an hourly resolution.

In FIG. 4, the collecting or acquiring of inference data is labeled as inference data 452, which may include forecasted data. Forecasted or other data, referred to in this example as inference data, may be used as input to a predictor. As a mere illustrative example, in a REG output power predictor, forecasted data could include weather forecast data for a future 24-hour period, where the forecasted weather may be used to predict REG output power. The forecasted data may be collected from any suitable sources, including from external data sources. In an embodiment, inference data may only consist of a feature set matrix. In an embodiment, the inference feature set for each predictor may have the same type of data as its training feature set.

The inference data may run through the same or similar preprocessing 454 as the training data, as described above.

The inference data may then be fed into its most recent trained model 458 to generate a prediction(s) for the particular target variable. Once the prediction(s) for the particular target variable has been generated, it may be stored, for example in a file or database in a computing device.

Figure 5:
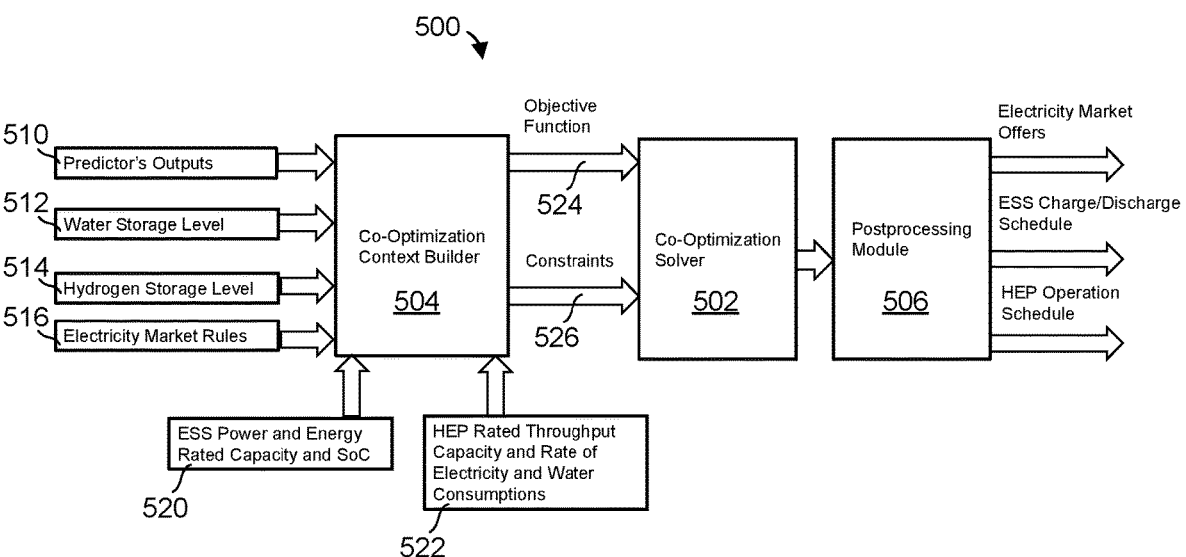
FIG. 5 is a block diagram of an example optimization engine based on a mathematical optimization model.

FIG. 5 is a block diagram of an example optimization engine 500, which in this embodiment may be optimizer engine 204 in FIG. 2. Generally, optimization engine 500 determines optimal values for decision variables over an optimization horizon, meaning a future time period. In this example embodiment, optimization engine 500 is based on a mathematical optimization model and a solver (e.g. optimizer 502) to find the optimal values for decision variables. However, it is to be appreciated that in other embodiments, the optimization may be based on other optimization approaches, including but not limited to machine learning techniques such as reinforcement learning.

In an embodiment, optimization engine 500 may be a co-optimization engine. Generally, co-optimization attempts to make decisions that are collectively optimal for multiple linked systems, which each may have distinct objectives. Co-optimization can model and analyze the entirety of the multiple systems, and can enable for the sharing of capabilities and resources across the multiple systems.

Co-optimization engine 500 may comprise an optimizer 502, labeled as a co-optimization solver in this embodiment, a co-optimization context builder 504, and a postprocessing module 506.

Co-optimization context builder 504 may collect, for example, one or more of output(s) of predictor(s) 510, a current water storage level 512 for a water source for a HEP, a current hydrogen storage level of a hydrogen storage system 514, current ESS storage level such as state-of-charge (SoC) for a battery-based ESS, ESS power and energy rated capacity 520, HEP rated throughput capacity (meaning maximum hydrogen generation capacity) and/or rate of electricity and water consumption 522, electricity market rules 516, and so on. Electricity market rules may generally include rules and procedures for submitting and handling of offers, for example defined by an ISO, and may include minimum and maximum quantities of electricity in offers, or prices that are allowed in the market, latest time to submit a bid or an offer for a specific trading interval, and so on. Some of this collected information may be obtained by sensors or other instruments or devices in the system or plants.

Furthermore, more generally, co-optimization context builder 504 may collect any suitable historical information and/or live or current data or information. This may include one or more of information relating to REG output power, electricity market price information, hydrogen market price information, electrical grid demand information, and so on.

In addition, collected information may comprise market price information, which may include electricity market price information, including predicted information, and hydrogen market price information, including predicted information.

Outputs of one or more predictors 510 may be output from any suitable predictor(s), including any predictors according to the present disclosure. For example, predicted information may include one or more of predicted REG output power information, predicted electricity market price information, predicted hydrogen market price information, predicted electrical grid demand information, and so on.

Co-optimization context builder 504 may use a configuration object such as file or database table to collect the information.

Co-optimization context builder 504 may build a mathematical optimization model for the optimizer 204 of the energy management system 202. A mathematical optimization model may include an objective function 524 and a set of constraints 526. The mathematical optimization model may be any suitable model(s) or algorithm(s) such as a linear optimization model, quadratic optimization model, mixed integer linear optimization model, nonlinear optimization model, or any other suitable models or algorithms.

The co-optimization objective function 524 may defines a mapping between decision variables (for example electricity and/or hydrogen market offer variables, ESS charge-discharge variable, ESS charge/discharge schedule variable, HEP operation variable, HEP operation schedule variable, hydrogen storage system fill-discharge variable for an hydrogen storage system associated with the HEP, and so on) and an objective of the system over an optimization horizon. As previously described, an objective may include, for example, minimizing the amount of REG power that is wasted or has to be sold at low cost, maximizing the amount of REG power that is sold to an electrical grid, maximizing the amount of hydrogen production by the hydrogen production plant, maximizing revenue or profit from sales of power and/or hydrogen, and so on.

The co-optimization constraints 526 may comprise equality and/or inequality constraints relating the decision variables or other parameters of the co-optimization model such as constraints on ESS maximum power and energy capacity, HEP rated throughput capacity, maximum transmission capacity of electric grid connection 170, water storage minimum level, Hydrogen storage maximum level, etc. Constraints may be of any suitable type or value. As a mere example, there may be periodic quotas for selling and delivering power and/or hydrogen to given customers or the grid. For instance, a quota could be to sell×kilowatts of power in given day, or to sell×cubic meters of hydrogen to a customer in a given day. Any supply of power or hydrogen in excess of the quota for that day may be handled in an optimized manner in line with the one or more objectives of the system. The excess supply, or part thereof, may be stored or sold.

Co-optimization solver 502 may receive objective function 524 and constraints 526, and possibly other information, and may then determine optimal values for decision variables over an optimization horizon. A solver 502 generally comprises an optimization algorithm(s). An optimization algorithm may include any suitable type(s) of optimization algorithm, including but surely not limited to a simplex algorithm, branch and bound algorithm, gradient descent algorithm, and genetic algorithm. Furthermore, solver 502 may be an off-the-shelf optimization solver library, a solver developed specifically for the mathematical optimization model, or some combination.

Accordingly, optimizer or solver 502 may use any suitable input information, for example REG output power information and market price information, to determine optimal values for decision variables over an optimization horizon. Decision variables may include any suitable decision variables. For example, in an embodiment, the decision variables may comprise one or more of an electricity market offer variable, a hydrogen market offer variable, and an energy storage system (ESS) charge-discharge variable for an ESS associated with the REG.

Postprocessing module 506 may then perform or trigger operations based on the determined optimal values for decision variables over the optimization horizon.

Optimal values may be determined for a first time period, for example for a future 24-hour period, while an optimization horizon may be for a second time period, for example for a future 7 day period containing the 24 hour period.

Example operations include generating an electricity market offer to an electrical grid, generating a hydrogen market offer to an hydrogen distribution system, generating an ESS charging/discharging schedule, for example for charging an ESS with power from an REG or a grid and discharging an ESS to a HEP or a grid, generating a HEP operation schedule, for example relating to when a HEP is operational producing hydrogen and the throughput quantity being produced, selectively charging an ESS with power generated by the REG, selectively charging an ESS with power from a grid, selectively dispatching power from the ESS to the HEP and/or to an electrical grid, selectively dispatches REG power to the HEP, selectively provides power to the HEP using power imported from an electrical grid, selectively storing produced hydrogen in the hydrogen storage system, selectively dispatching hydrogen from the hydrogen storage system to the hydrogen distribution system, selectively receiving hydrogen from the hydrogen distribution system, selectively storing the received hydrogen in the hydrogen storage system, selectively dispatching hydrogen from the hydrogen storage system to the hydrogen distribution system, selectively receiving hydrogen from the hydrogen distribution system and storing the received hydrogen in the hydrogen storage system, and so on. Additionally, further operations may include dispatching REG power to the electrical grid and/or dispatching produced hydrogen to the hydrogen distribution system based on the generated electricity market offer and hydrogen market offer.

In an embodiment, output(s) of postprocessing module 506 may be modified, for example by a human operator, for example to correct any issues, before postprocessing module 506 performs the operations. Modifications may be performed via a user interface of a computing device of energy management system 202 or of a computing device that is in communication with system 202.

Figure 6:
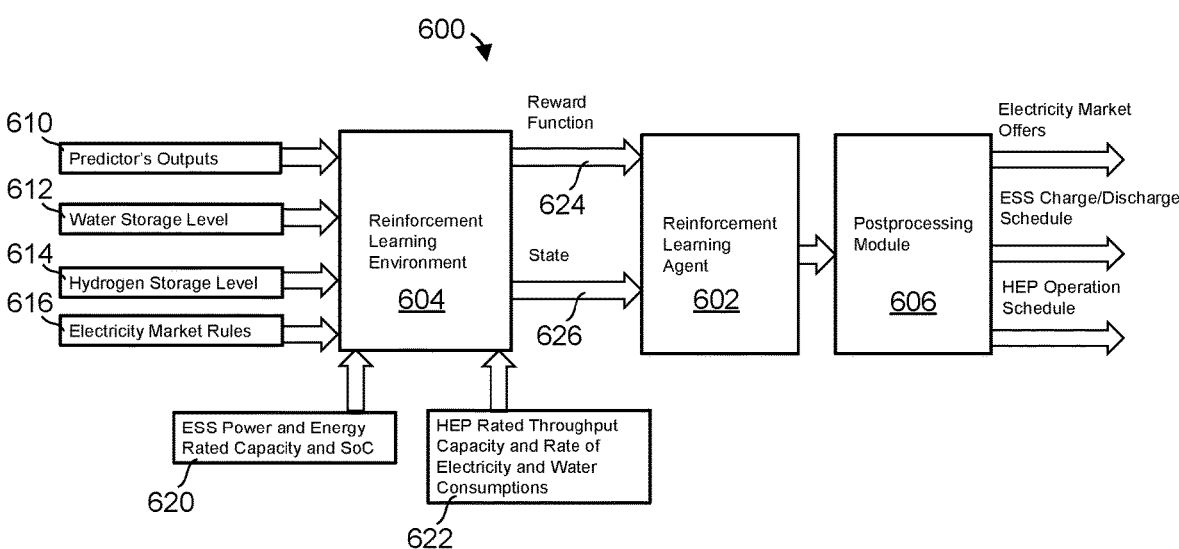
FIG. 6 is a block diagram of an example optimization engine based on a reinforcement learning model.

Co-optimization engine 500 may repeat the optimization at any suitable intervals, including at fixed intervals or in response to some triggering action. As a mere example, engine 500 may perform an optimization FIG. 6 is a block diagram of an example optimization engine 600, which may be optimizer engine 204 in FIG. 2. In comparison to the embodiment of FIG. 5, in this example embodiment, optimization engine 600 is based on a reinforcement learning model and a reinforcement learning agent 602 to find the optimal values for decision variables.

For simplicity, the description of aspects of engine 600 of FIG. 6 that may be similar to aspects of engine 500 of FIG. 5 are not repeated.

Co-optimization engine 600 may comprise an optimizer 602, in the form a reinforcement learning agent, a reinforcement learning environment 604, and a postprocessing module 606.

Reinforcement learning environment 604 may comprise some or all of the information 610, 612, 614, 616, 620, 622, similar to the information collected by co-optimization context builder 504 in the embodiment of FIG. 5.

A reinforcement learning model may include a reward function 624 and state information 626. The reinforcement learning model may be any suitable model(s) or algorithm(s). Non-limiting examples of reinforcement learning algorithms or techniques include but are not limited to Q-learning, state-action-reward-state-action (SARSA), deep Q-networks (DQNs), deep deterministic policy gradient (DDPG), actor-critic, and so on.

Reinforcement learning agent 602 may receive reward function 624 and state 626, and may then determine optimal values for decision variables over an optimization horizon.

FIG. 7 is a process flow diagram of an example method. The example method may be performed at or by one or more electronic devices each having one or more computer processors and computer-readable memory.

At block 700, the process involves receiving renewable energy generator (REG) output power information associated with an REG. The REG output power information may include predicted REG output power information. The REG may be associated with a hydrogen production plant (HPP) for producing hydrogen, and the HPP may be powered at least by the REG.

At block 702, the process may involve receiving market price information. The market price information may include predicted electricity market price information and predicted hydrogen market price information.

At block 704, the process may involve executing an optimizer using the REG output power information and the market price information to determine optimal values for decision variables in an optimization horizon. The decision variables may comprise an electricity market offer variable and a hydrogen market offer variable.

At block 706, the process may involve executing an energy management system, the energy management system managing the utilization of power generated by the REG. The energy management system may generate, based on the optimal values, an electricity market offer to an electrical grid, and/or a hydrogen market offer to an hydrogen distribution system. The energy management system, based on the generated electricity market offer and hydrogen market offer, may dispatch REG power to the electrical grid and/or dispatch produced hydrogen to the hydrogen distribution system.

In some embodiments, algorithms, techniques, and/or approaches according to the present disclosure may be performed or based on artificial intelligence (AI) algorithms, techniques, and/or approaches. This includes but is not limited to predictors and/or optimizers according to the present disclosure, as well as controlling of controllable assets, for example an REG, HEP, ESS, hydrogen storage system, and so on.

In some embodiments, the AI algorithms and techniques may include machine learning techniques.

Machine Learning (ML) may be used in power or energy systems, including REG energy management systems. Machine learning systems may be used to predict information associated with one or more assets, for example electricity market prices, hydrogen market prices, REG output power, electricity demand, and so on. Machine learning models may be used, as a mere example, to predict future resource availability and demand requirements, and/or control assets in a system, for instance using one or more optimizations. Forecasters or predictors may be used to control or schedule REG energy generation, hydrogen production, electricity dispatching hydrogen dispatching, and so on. Further, forecasters and/or optimizers, and the training thereof, may also use or be based on machine learning techniques.

A machine learning algorithm or system may receive data, for example historical data, streaming controllable asset data, environmental data, and/or third party data, and, using one or more suitable machine learning algorithms, may generate one or more datasets. Example types of machine learning algorithms include but are not limited to supervised learning algorithms, unsupervised learning algorithms, reinforcement learning algorithms, semi-supervised learning algorithms (e.g. where both labeled and unlabeled data is used), regression algorithms (for example logistic regression, linear regression, and so forth), regularization algorithms (for example least-angle regression, ridge regression, and so forth), artificial neural network algorithms, instance based algorithms (for example locally weighted learning, learning vector quantization, and so forth), Bayesian algorithms, decision tree algorithms, clustering algorithms, and so forth. Further, other machine learning algorithms may be used additionally or alternatively. In some embodiments, a machine learning algorithm or system may analyze data to identify patterns and/or sequences of activity, and so forth, to generate one or more datasets.

An energy management system may comprise one or more control policies. The control policies of the system may be based on trained machine learning based systems. In this sense, a control policy may be part of a control agent. A control agent observes its environment, herein referred to a control environment, and takes action based on its observations, or percepts, of the control environment. The taking of action is referred to as controlling the system. Depending on the state of the environment, taking action may involve taking no action at all, for example if there has been little or no change in the state since the last time the agent took action. Thus, doing nothing is a valid action in a set of actions in the action space of the controller. In an embodiment, the present systems and methods may exploit the flexibility of controllable assets in the system to achieve improved performance of the system. For example, the flexibility of controllable assets may be exploited in response to changes in the control environment.

In an embodiment, online machine learning may be employed. Online machine learning is a technique of machine learning where data becomes available sequentially over time. The data is utilized to update a predictor for future data at each step in time (e.g. time slot). This approach of online machine learning may be contrasted to approaches that use batch learning wherein learning performed on an entire or subset of training data set. Online machine learning is sometimes useful where the data varies significantly over time, such as in power or energy pricing, commodity pricing, and stock markets. Further, online machine learning may be helpful when it is not practical or possible to train the agent over the entire or subset of data set.

In embodiments according to the present disclosure, training of a machine learning system, such as a predictor or optimizer, may be based on offline learning and/or online learning where streaming real-time data may be combined with at least some data, for example from a database to train the machine learning system in real-time or near real-time.

FIG. 8 is a block diagram of an example computerized device or system 800 that may be used in implementing one or more aspects or components of an embodiment according to the present disclosure. For example, system 800 may be used to implement a computing device or system, such as an optimizer, predictor, or controller, to be used with a device, system or method according to the present disclosure. Thus, one or more systems 800 may be configured to implement one or more portions of the systems or apparatuses or methods according to FIGS. 1-7. This includes an energy management system.

Computerized system 800 may comprise one or more of classic, analog, electronic, digital, and quantum computing technologies. Computerized system 800 may include one or more of a computer processor 802, memory 804, a mass storage device 810, an input/output (I/O) interface 806, and a communications subsystem 808. A computer processor device may be any suitable device(s), and encompasses various devices, systems, and apparatus for processing data and instructions. These include, as examples only, one or more of a hardware processor, a digital processor, an electronic processor, a quantum processor, a programmable processor, a computer, a system on a chip, and special purpose logic circuitry such as an ASIC (application-specific integrated circuit) and/or FPGA (field programmable gate array).

Memory 804 may be configured to store computer readable instructions, that when executed by processor 802, cause the performance of operations, including operations in accordance with the present disclosure.

One or more of the components or subsystems of computerized system 800 may be interconnected by way of one or more buses 812 or in any other suitable manner.

The bus 812 may be one or more of any type of several bus architectures including a memory bus, storage bus, memory controller bus, peripheral bus, or the like. The processor 802 may comprise any type of electronic data processor. The memory 804 may comprise any type of system memory such as dynamic random access memory (DRAM), static random access memory (SRAM), synchronous DRAM (SDRAM), read-only memory (ROM), flash memory, a combination thereof, or the like. In an embodiment, the memory may include ROM for use at boot-up, and DRAM for program and data storage for use while executing programs.

The mass storage device 810 may comprise any type of storage device configured to store data, programs, and other information and to make the data, programs, and other information accessible via the bus 812. The storage device may be adapted to store one or more databases and/or data repositories, each of which is generally an organized collection of data or other information stored and accessed electronically via a computer. The term database or repository may thus refer to a storage device comprising a database. The mass storage device 810 may comprise one or more of a solid state drive, hard disk drive, a magnetic disk drive, an optical disk drive, or the like. In some embodiments, data, programs, or other information may be stored remotely, for example in the cloud. Computerized system 800 may send or receive information to the remote storage in any suitable way, including via communications subsystem 808 over a network or other data communication medium.

The I/O interface 806 may provide interfaces for enabling wired and/or wireless communications between computerized system 800 and one or more other devices or systems, such as an electric vehicle charging system. Furthermore, additional or fewer interfaces may be utilized. For example, one or more serial interfaces such as Universal Serial Bus (USB) (not shown) may be provided. Further, system 800 may comprise or be communicatively connectable to a display device, and/or speaker device, a microphone device, an input device such as a keyboard, button, pointer, mouse, touch screen display, microphone, camera, scanner, or any other type of input device.

Computerized system 800 may be used to configure, operate, control, monitor, sense, and/or adjust devices, systems, and/or methods according to the present disclosure.

A communications subsystem 808 may be provided for one or both of transmitting and receiving signals over any form or medium of digital data communication, including a communication network. Examples of communication networks include a local area network (LAN), a wide area network (WAN), telecommunications network, cellular network, an inter-network such as the Internet, and peer-to-peer networks such as ad hoc peer-to-peer networks. Communications subsystem 808 may include any component or collection of components for enabling communications over one or more wired and wireless interfaces. These interfaces may include but are not limited to USB, Ethernet (e.g. IEEE 802.3), high-definition multimedia interface (HDMI), Firewire™ (e.g. IEEE 1374), Thunderbolt™, WiFi™ (e.g. IEEE 802.11), WIMAX (e.g. IEEE 802.16), Bluetooth™, or Near-field communications (NFC), as well as General Packet Radio Service (GPRS), Universal Mobile Telecommunications System (UMTS), Long-Term Evolution (LTE), LTE-A, 5G NR (New Radio), satellite communication protocols, and dedicated short range communication (DSRC). Communication subsystem 808 may include one or more ports or other components (not shown) for one or more wired connections. Additionally or alternatively, communication subsystem 808 may include one or more transmitters, receivers, and/or antenna. Further, computerized system 800 may comprise clients and servers (none of which are shown).

Computerized system 800 of FIG. 8 is merely an example and is not meant to be limiting. Various embodiments may utilize some or all of the components shown or described. Some embodiments may use other components not shown or described but known to persons skilled in the art.

Logical operations of the various embodiments according to the present disclosure may be implemented as (i) a sequence of computer implemented steps, procedures, or operations running on a programmable circuit in a computer, (ii) a sequence of computer implemented operations, procedures, or steps running on a specific-use programmable circuit; and/or (iii) interconnected machine modules or program engines within the programmable circuits. The computerized device or system 800 of FIG. 8 may practice all or part of the recited methods or operations, may be a part of systems according to the present disclosure, and/or may operate according to instructions in computer-readable storage media. Such logical operations may be implemented as modules configured to control a computer processor, such as processor 802, to perform particular functions according to the programming of the module. In other words, a computer processor, such as processor 802, may execute the instructions, steps, or operations according to the present disclosure, including of the one or more of the blocks or modules. For example, one or more of the modules or blocks, for example any of those in any of FIGS. 1-7, may be configured to control processor 802. At least some of these blocks or modules may be stored on storage device 810 and loaded into memory 804 at runtime or may be stored in other computer-readable memory locations.

The concepts of real-time and near real-time may be defined as providing a response or output within a predetermined time interval, usually a relatively short time. A time interval for real-time is generally shorter than an interval for near real-time. Mere non-limiting examples of predetermined time intervals may include the following as well as values below, between, and/or above these figures: 10 s, 60 s, 5 min, 10 min, 20 min, 30 min, 60 min, 2 hr, 4 hr, 6 hr, 8 hr, 10 hr, 12 hr, 1 day.

The term module used herein may refer to a software module, a hardware module, or a module comprising both software and hardware. Generally, software includes computer executable instructions, and possibly also data, and hardware refers to physical computer hardware.

The term 'data' generally refers to raw or unorganized facts whereas 'information' generally refers to processed or organized data. However, the terms are generally used synonymously herein unless indicated otherwise.

Embodiments and operations according to the present disclosure may be implemented in digital electronic circuitry, and/or in computer software, firmware, and/or hardware, including structures according to this disclosure and their structural equivalents. Embodiments and operations according to the present disclosure may be implemented as one or more computer programs, for example one or more modules of computer program instructions, stored on or in computer storage media for execution by, or to control the operation of, one or more computer processing devices such as a processor. Operations according to the present disclosure may be implemented as operations performed by one or more processing devices on data stored on one or more computer-readable storage devices or media, and/or received from other sources.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not necessarily provided as to whether the embodiments described herein are implemented as a computer software, computer hardware, electronic hardware, or a combination thereof.

In at least some embodiments, one or more aspects or components may be implemented by one or more special-purpose computing devices. The special-purpose computing devices may be any suitable type of computing device, including desktop computers, portable computers, handheld computing devices, networking devices, or any other computing device that comprises hardwired and/or program logic to implement operations and features according to the present disclosure.

Embodiments of the disclosure may be represented as a computer program product stored in a machine-readable medium (also referred to as a computer-readable medium, a processor-readable medium, or a computer usable medium having a computer-readable program code embodied therein). The machine-readable medium may be any suitable tangible, non-transitory medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The structure, features, accessories, and/or alternatives of embodiments described and/or shown herein, including one or more aspects thereof, are intended to apply generally to all of the teachings of the present disclosure, including to all of the embodiments described and illustrated herein, insofar as they are compatible. Thus, the present disclosure includes embodiments having any combination or permutation of features of embodiments or aspects herein described.

In addition, the steps and the ordering of the steps of methods and data flows described and/or illustrated herein are not meant to be limiting. Methods and data flows comprising different steps, different number of steps, and/or different ordering of steps are also contemplated. Furthermore, although some steps are shown as being performed consecutively or concurrently, in other embodiments these steps may be performed concurrently or consecutively, respectively.

For simplicity and clarity of illustration, reference numerals may have been repeated among the figures to indicate corresponding or analogous elements. Numerous details have been set forth to provide an understanding of the embodiments described herein. The embodiments may be practiced without these details. In other instances, well-known methods, procedures, and components have not been described in detail to avoid obscuring the embodiments described.

The embodiments according to the present disclosure are intended to be examples only. Alterations, modifications and variations may be effected to the particular embodiments by those of skill in the art without departing from the scope, which is defined solely by the claims appended hereto.

The terms "a" or "an" are generally used to mean one or more than one. Furthermore, the term "or" is used in a non-exclusive manner, meaning that "A or B" includes "A but not B," "B but not A," and "both A and B" unless otherwise indicated. In addition, the terms "first," "second," and "third," and so on, are used only as labels for descriptive purposes, and are not intended to impose numerical requirements or any specific ordering on their objects.

The invention claimed is:

1. A system comprising:
   a computer-readable storage medium having executable instructions; and
   one or more computer processors configured to execute the instructions to:
   receive renewable energy generator (REG) output power information associated with an REG, the REG output power information including predicted REG output power information comprising predicted REG output power over a predefined time horizon, wherein the REG is associated with a hydrogen production plant (HPP) for producing hydrogen, and wherein the HPP is powered at least by the REG;

receive market price information, the market price information including predicted electricity market price information and predicted hydrogen market price information;

execute an optimizer using the REG output power information and the market price information to determine values for decision variables in an optimization horizon, wherein the decision variables comprise an electricity market offer variable, hydrogen market offer variable, and a HPP operation schedule variable relating to when the HPP is operating to produce hydrogen; and execute an energy management system, the energy management system managing the utilization of power generated by the REG including selectively dispatching REG power to the HPP based on the values, and the energy management system generating, based on the values:

an electricity market offer to an electrical grid; and
a hydrogen market offer to an hydrogen distribution system, and the energy management system, based on the generated electricity market offer and hydrogen market offer, dispatching REG power to the electrical grid and dispatching produced hydrogen to the hydrogen distribution system.

2. The system of claim 1, wherein the decision variables further comprise an energy storage system (ESS) charge-discharge variable for an ESS associated with the REG, and wherein the energy management system controls, based on the values:

selectively charging the ESS with power generated by the REG; and
selectively dispatching power from the ESS to the HPP and/or to an electrical grid.

3. The system of claim 1, wherein the energy management system, based on the values, selectively provides power to the HPP using power imported from an electrical grid.

4. The system of claim 1, wherein the decision variables further comprise a hydrogen storage system fill-discharge variable for an hydrogen storage system associated with the HPP, and wherein the energy management system controls, based on the values:

selectively storing produced hydrogen in the hydrogen storage system; and
selectively dispatching hydrogen from the hydrogen storage system to the hydrogen distribution system.

5. The system of claim 4, wherein the energy management system controls, based on the values:

selectively receiving hydrogen from the hydrogen distribution system and storing the received hydrogen in the hydrogen storage system.

6. The system of claim 1, wherein the one or more computer processors are further configured to execute the instructions to:

receive electrical grid demand information, the electrical grid demand information including predicted electrical grid demand information,
wherein the optimizer is executed further using the electrical grid demand information.

7. The system of claim 1, wherein the one or more computer processors are further configured to execute the instructions to:

execute a predictor comprising a predictive model to predict at least one of the predicted REG output power information, the predicted electricity market price information, and the predicted hydrogen market price information, wherein the predictive model comprises a machine learning model.

8. The system of claim 1, wherein the optimizer comprises a reinforcement learning model.

9. A method comprising:

at one or more electronic devices each having one or more processors and computer-readable memory:

receiving renewable energy generator (REG) output power information associated with an REG, the REG output power information including predicted REG output power information comprising predicted REG output power over a predefined time horizon, wherein the REG is associated with a hydrogen production plant (HPP) for producing hydrogen, and wherein the HPP is powered at least by the REG;

receiving market price information, the market price information including predicted electricity market price information and predicted hydrogen market price information;

executing an optimizer using the REG output power information and the market price information to determine values for decision variables in an optimization horizon, wherein the decision variables comprise an electricity market offer variable, hydrogen market offer variable, and a HPP operation schedule variable relating to when the HPP is operating to produce hydrogen; and executing an energy management system, the energy management system managing the utilization of power generated by the REG including selectively dispatching REG power to the HPP based on the values, and the energy management system generating, based on the values:

an electricity market offer to an electrical grid; and
a hydrogen market offer to an hydrogen distribution system, and the energy management system, based on the generated electricity market offer and hydrogen market offer, dispatching REG power to the electrical grid and dispatching produced hydrogen to the hydrogen distribution system.

10. The method of claim 9, wherein the decision variables further comprise an energy storage system (ESS) charge-discharge variable for an ESS associated with the REG, and wherein the method further comprises controlling, based on the values:

selectively charging the ESS with power generated by the REG; and
selectively dispatching power from the ESS to the HPP and/or to an electrical grid.

11. The method of claim 9, further comprising, based on the values, selectively providing power to the HPP using power imported from an electrical grid.

12. The method of claim 9, wherein the decision variables further comprise a hydrogen storage system fill-discharge variable for an hydrogen storage system associated with the HPP, and wherein the method further comprises controlling, based on the values:

selectively storing produced hydrogen in the hydrogen storage system; and
selectively dispatching hydrogen from the hydrogen storage system to the hydrogen distribution system.

13. The method of claim 12, further comprising controlling, based on the values:

selectively receiving hydrogen from the hydrogen distribution system and storing the received hydrogen in the hydrogen storage system.

14. The method of claim 9, further comprising:

receiving electrical grid demand information, the electrical grid demand information including predicted electrical grid demand information, wherein the executing the optimizer uses the electrical grid demand information.

15. The method of claim 9, further comprising:

executing a predictor comprising a predictive model to predict at least one of the predicted REG output power information, the predicted electricity market price information, and the predicted hydrogen market price information, wherein the predictive model comprises a machine learning model.

16. The method of claim 9, wherein the optimizer comprises a reinforcement learning model.

17. A non-transitory computer-readable medium having computer-readable instructions stored thereon, the computer-readable instructions executable by at least one processor to cause the performance of operations comprising:

receiving renewable energy generator (REG) output power information associated with an REG, the REG output power information including predicted REG output power information comprising predicted REG output power over a predefined time horizon, wherein the REG is associated with a hydrogen production plant (HPP) for producing hydrogen, and wherein the HPP is powered at least by the REG;

receiving market price information, the market price information including predicted electricity market price information and predicted hydrogen market price information;

executing an optimizer using the REG output power information and the market price information to determine values for decision variables in an optimization horizon, wherein the decision variables comprise an electricity market offer variable, hydrogen market offer variable, and a HPP operation schedule variable relating to when the HPP is operating to produce hydrogen; and executing an energy management system, the energy management system managing the utilization of power generated by the REG including selectively dispatching REG power to the HPP based on the values, and the energy management system generating, based on the values:

an electricity market offer to an electrical grid; and a hydrogen market offer to an hydrogen distribution system, and the energy management system, based on the generated electricity market offer and hydrogen market offer, dispatching REG power to the electrical grid and dispatching produced hydrogen to the hydrogen distribution system.

18. The non-transitory computer-readable medium of claim 17, wherein the decision variables further comprise an energy storage system (ESS) charge-discharge variable for an ESS associated with the REG, and wherein the operations further comprise controlling, based on the values:

selectively charging the ESS with power generated by the REG; and selectively dispatching power from the ESS to the HPP and/or to an electrical grid.

* * * * *